3,373,183
MANUFACTURE OF 2,2,4,4-TETRAALKYL-
3-OXOBUTYRONITRILES
Edgar L. McDaniel and James P. Hawk, Kingsport, Tenn.,
assignors to Eastman Kodak Company, Rochester, N.Y.,
a corporation of New Jersey
No Drawing. Filed Nov. 1, 1965, Ser. No. 505,951
10 Claims. (Cl. 260—465.1)

This invention relates to a novel chemical process and more particularly to a novel catalytic process for the preparation of 2,2,4,4-tetraalkyl-3-oxobutyronitriles by the reaction of a 2,2,4,4-tetraalkylcyclobutane-1,3-dione with ammonia.

The chemical reaction taking place during the process of our invention can be represented by the equation:

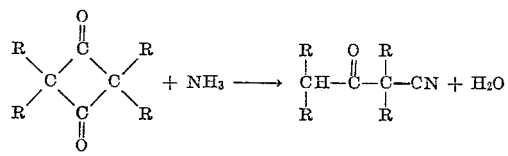

In the formulae in the foregoing equation the substituents R can be the same or different and are alkyl groups. The alkyl groups represented by R typically contain up to about 18 carbon atoms and preferably contain from 1 to about 8 carbon atoms. In especially preferred embodiments of our invention, each of the alkyl groups are lower alkyl having 1 to about 4 carbon atoms.

The process of our invention is carried out by contacting the 2,2,4,4-tetraalkylcyclobutane-1,3-dione with ammonia in the presence of a catalyst while each of the reactants are in the vapor phase.

As can be seen from the foregoing equation, the 2,2,4,4-tetraalkylcyclobutane-1,3-dione and the ammonia react in equimolar amounts. In general, we prefer to employ a stoichiometric excess of ammonia; e.g., about 4 moles of ammonia per mole of 2,2,4,4-tetraalkylcyclobutane-1,3-dione. However, the reaction can be carried out with stoichiometric equivalents of the reactants or a stoichiometric excess of the 2,2,4,4-tetraalkylcyclobutane-1,3-dione can be employed. In addition, the amount of ammonia employed can exceed the aforementioned 4:1 ratio.

The reaction is generally carried out at or near atmospheric pressure for reasons of convenience. However, subatmospheric or superatmospheric pressures can be employed if desired.

In general, the process of our invention is carried out by passing a gaseous mixture of ammonia and a 2,2,4,4-tetraalkylcyclobutane-1,3-dione over the catalyst. The gaseous mixture can contain a diluent; e.g., steam, nitrogen, hydrogen, or other diluent which is substantially inert to the reactants under the reaction conditions.

Suitable catalysts for use in our invention are those which are known to be useful as dehydrogenation catalysts. Examples of such useful catalysts include vanadium oxide on activated alumina; nickel on silica; rare earth metal oxides such as lanthanum oxide, etc. on activated alumina; activated carbon; calcium nickel phosphate; molybdic oxide on activated alumina; etc. Examples of especially suitable catalysts include activated carbon, calcium nickel phosphate, or molybdic oxide supported on activated alumina.

The reaction is carried out at elevated temperature; e.g., a temperature of about 150° C. to about 500° C. Preferred reaction temperatures vary with the catalyst being employed. Thus, with an activated carbon catalyst preferred reaction temperatures range from about 250° C. to about 350° C. whereas, with calcium nickel phosphate or with molybdic oxide on activated alumina, preferred reaction temperatures are from about 200° C. to about 350° C. An especially preferred range of reaction temperatures, when calcium nickel phosphate or molybdic oxide on activated alumina is employed as the catalyst, is from about 225° C. to about 250° C.

The time during which the reactants are in contact with the catalyst can range from a fraction of a second; e.g., 0.1 second or less, up to several seconds; e.g., 10 seconds or longer. Generally, contact times of the order of about 2 seconds are suitable.

The following examples illustrate the process of our invention. In the following examples, percent conversion and percent yield were determined according to the following equations.

Percent conversion of dione to 3-oxobutyronitrile =

$$\frac{\text{moles 3-oxobutyronitrile made}}{\text{moles dione fed}} \times 100$$

Percent yield of 3-oxobutyronitrile =

$$\frac{\text{moles 3-oxobutyronitrile made}}{\text{moles of dione consumed}} \times 100$$

*Example 1*

Seventy ml. of activated carbon 4 x 10 mesh was charged to a reactor comprising a 1″ x 36″ Vycor glass tube. Twenty-eight ml. of Vycor cullet was placed on top of the carbon to act as a preheating zone. The reactor was then heated in a vertical electric furnace to 300° C. The reaction was carried out by passing tetramethyl-1,3-cyclobutanedione, ammonia, hydrogen and nitrogen in an approximate mole ratio of 1:4:2:3 into the catalyst bed for one-half hour with a contact time of 2 sec. The condensed products were then isolated by distillation and analyzed. The fraction boiling at 43° C. at 2.2 mm. had a $n_D^{20}$ of 1.4200 and an elemental analysis of C 69.23%, H 9.53%, and N 9.93%. Theory for 2,2,4-trimethyl-3-oxovaleronitrile is C 69.08%, H 9.35%, and N 10.07%. Further confirmation was obtained by infrared, mass spectra, and nuclear-magnetic resonance ananlyses. The conversion to 2,2,4-trimethyl-3-oxovaleronitrile was 48% and the yield 54%.

*Example 2*

A run was carried out over a period of 120 min. at 253° C. as described in Example 1 using as a catalyst 70 ml. of calcium nickel phosphate stabilized with chromium oxide. The 2,2,4-trimethyl-3-oxovaleronitrile was obtained in a conversion of 16% and a yield of 35%.

*Example 3*

A run was carried out as described in Example 2 at 235° C. for 90 min. to produce 2,2,4-trimethyl-3-oxovaleronitrile in a 14% conversion and a 42% yield.

*Example 4*

Another run was carried out as described in Example 3 for 120 min. to give a 22% conversion and a 47% yield of 2,2,4-trimethyl-3-oxovaleronitrile.

*Example 5*

Seventy ml. of a catalyst consisting of 10% MoO₃ on activated alumina (3/16″ tablets) was charged to a Vycor tube and heated in an electric furnace to 225° C. Tetramethyl-1,3-cyclobutanedione, ammonia, and nitrogen were passed into the catalyst bed in a mole ratio of 1:4:4 at a contact time of 2.5 sec. The conversion to 2,2,4-trimethyl-3-oxovaleronitrile was 10%.

*Example 6*

A quantity of 2,4-dibutyl-2,4-diethyl-1,3-cyclobutanedione was allowed to react with ammonia over activated carbon in a manner similar to that described in Example 1. The conversion and yield to 2-butyl-2,4-diethyl-3-oxo-octanenitrile (B.P. 133–140° C./3 mm.) were 36 and 47%, respectively.

Example 7

In another run 2,4-diethyl - 2,4 - dimethyl-1,3-cyclobutanedione was allowed to react with ammonia over activated carbon in the manner described in Example 6, to give a 28% conversion and 49% yield of 2-ethyl-2,4-dimethyl-3-oxohexanenitrile (B.P. 121–128° C./17 mm.).

Example 8

2,2,4,4-tetraethyl-1,3-cyclobutanedione was allowed to react with ammonia over a catalyst comprising calcium nickel phosphate, stabilized with chromium oxide, in a manner described in Example 2 to give 2,2,4-triethyl-3-oxohexanenitrile (B.P. 58–65° C./3 mm.) in a 15% conversion and 32% yield.

The compounds prepared by our process are difunctional organic compounds which find a wide variety of uses; e.g., as intermediates in preparing polymers, plasticizers, perfume ingredients, etc. Thus, the compounds prepared by our process can be hydrolyzed to form 2,2,4,4-tetraalkyl-3-oxobutyric acids which can be esterified to form keto-esters that are useful as perfume ingredients as shown in Kitchens et al. U.S. Patent 3,197,500. The following example illustrates the preparation of such a compound.

Example 9

A solution of 16 g. (0.4 mole) of NaOH in 100 ml. of water was chilled and 76.5 g. (0.35 mole) of 2-butyl-2,4-diethyl-3-oxooctanenitrile was carefully added with rapid stirring. The temperature of the mixture was kept at 20–30° C. until all the ketonitrile had been added. The mixture was slowly warmed on a steam bath and kept at near boiling for a few hours. The bulk of the water vaporized off leaving a pastry mass. Twenty-five ml. of water was added; the mixture was cooled and neutralized with 50% $H_2SO_4$. The free acid was extracted with diethyl ether and dried over sodium sulfate. The ether was evaporated off and the crude acid esterified with ethyl alcohol. Distillation of the product gave a 28% overall yield of ethyl 2-butyl-2,4-diethyl-3-oxooctanoate (B.P. 110° C./4 mm.).

Although the invention has been described in considerable detail with particular reference to certain preferred embodiments thereof, variations and modifications can be effected within the spirit and scope of the invention as described hereinbefore and as defined in the appended claims.

We claim:
1. The process which comprises contacting a 2,2,4,4-tetraalkylcyclobutane-1,3-dione of the formula:

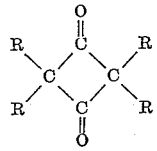

with ammonia in the vapor phase at elevated temperature and in the presence of dehydrogenation catalyst and obtaining a 2,2,4,4-tetraalkyl-3-oxobutyronitrile of the formula:

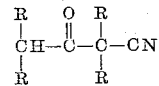

in which each R is lower alkyl.

2. The process of claim 1 in which the dehydrogenation catalyst comprises activated carbon and in which the contacting of the 2,2,4,4-tetraalkylcyclobutane-1,3-dione and ammonia is carried out at a temperature of about 250° C. to about 350° C.

3. The process of claim 2 in which the 2,2,4,4-tetraalkylcyclobutane-1,3-dione is 2,2,4,4-tetramethylcyclobutane-1,3-dione and in which the 2,2,4,4-tetraalkyl-3-oxobutyronitrile obtained is 2,2,4-trimethyl-3-oxovaleronitrile.

4. The process of claim 2 in which the 2,2,4,4-tetraalkylcyclobutane-1,3-dione is 2,4-dibutyl-2,4-diethylcyclobutane-1,3-dione and in which the 2,2,4,4-tetraalkyl-3-oxobutyronitrile obtained is 2-butyl-2,4-diethyl-3-oxooctanenitrile.

5. The process of claim 2 in which the 2,2,4,4-tetraalkylcyclobutane-3-dione is 2,4-diethyl-2,4-dimethylcyclobutane-1,3-dione and in which the 2,2,4,4-tetraalkyl-3-oxobutyronitrile obtained is 2-ethyl-2,4-dimethyl-3-oxohexanenitrile.

6. The process of claim 1 in which the dehydrogenation catalyst comprises calcium nickel phosphate and in which the contacting of the 2,2,4,4-tetraalkylcyclobutane-1,3-dione and ammonia is carried out at a temperature of about 200° C. to about 350° C.

7. The process of claim 6 in which the 2,2,4,4-tetraalkylcyclobutane-1,3-dione is 2,2,4,4-tetramethylcyclobutane-1,3-dione and in which the 2,2,4,4-tetraalkyl-3-oxobutyronitrile obtained is 2,2,4-trimethyl-3-oxovaleronitrile.

8. The process of claim 6 in which the 2,2,4,4-tetraalkylcyclobutane-1,3-dione is 2,2,4,4-tetraethylcyclobutane-1,3-dione and in which the 2,2,4,4-tetraalkyl-3-oxobutyronitrile obtained is 2,2,4-triethyl-3-oxohexanenitrile.

9. The process of claim 1 in which the dehydrogenation catalyst comprises an oxide of molybdenum on activated alumina and in which the contacting of the 2,2,4,4-tetraalkylcyclobutane-1,3-dione and ammonia is carried out at a temperature of about 200° C. to about 350° C.

10. The process of claim 9 in which the 2,2,4,4-tetraalkylcyclobutane-1,3-dione is 2,2,4,4-tetramethylcyclobutane-1,3-dione and in which the 2,2,4,4-tetraalkyl-3-oxobutyronitrile obtained is 2,2,4-trimethyl - 3 - oxovaleronitrile.

References Cited

UNITED STATES PATENTS 3,072,724   1/1963   Elam et al. _____ 260—561

JOSEPH P. BRUST, *Primary Examiner.*